United States Patent
Moreno et al.

(10) Patent No.: US 11,182,174 B2
(45) Date of Patent: Nov. 23, 2021

(54) SYSTEM CONFIGURATION ANALYSIS FOR MIGRATION

(71) Applicant: HEWLETT PACKARD ENTERPRISE DEVELOPMENT LP, Houston, TX (US)

(72) Inventors: Javier Lopez Moreno, Las Rozas (ES); Davor Koncic, Duebendorf (CH); Rolf Eberhardt, Liebefeld (CH)

(73) Assignee: Hewlett Packard Enterprise Development LP, Houston, TX (US)

(*) Notice: Subject to any disclaimer, the term of this patent is extended or adjusted under 35 U.S.C. 154(b) by 119 days.

(21) Appl. No.: 16/363,112

(22) Filed: Mar. 25, 2019

(65) Prior Publication Data
US 2020/0257540 A1  Aug. 13, 2020

Related U.S. Application Data

(60) Provisional application No. 62/803,577, filed on Feb. 10, 2019.

(51) Int. Cl.
| | | |
|---|---|---|
| G06F 9/24 | (2006.01) | |
| G06F 9/445 | (2018.01) | |
| G06F 9/4401 | (2018.01) | |

(52) U.S. Cl.
CPC ........ *G06F 9/44505* (2013.01); *G06F 9/4401* (2013.01)

(58) Field of Classification Search
CPC ................................................ G06F 9/44505
See application file for complete search history.

(56) References Cited

U.S. PATENT DOCUMENTS

| | | | | |
|---|---|---|---|---|
| 9,009,058 | B2* | 4/2015 | Erickson | G06F 8/34 |
| | | | | 705/1.1 |
| 9,501,263 | B2* | 11/2016 | Pana | G06F 8/35 |
| 2008/0270515 | A1* | 10/2008 | Chen | H04L 67/16 |
| | | | | 709/202 |
| 2009/0055421 | A1* | 2/2009 | Lier | G06F 16/88 |
| 2009/0228512 | A1* | 9/2009 | Chopra | G06F 8/71 |
| 2010/0293316 | A1* | 11/2010 | Mehrotra | H04L 41/147 |
| | | | | 710/316 |

(Continued)

FOREIGN PATENT DOCUMENTS

EP   2993825 A2   3/2016

OTHER PUBLICATIONS

Halle, S. et al., "Self-configuration of Network Devices with Configuration Logic," Autonomic Networking, 2006, pp. 36-49, http://dl.ifip.org/db/conf/ifip6/an2006/HalleWVC06.pdf.

(Continued)

*Primary Examiner* — Volvick Derose
(74) *Attorney, Agent, or Firm* — Nolte Lackenbach Siegel

(57) ABSTRACT

A method for migrating from a legacy system to a target system may include extracting a legacy system configuration into a structured model and analyzing the structured model, the analyzing including determining a set of patterns and deriving a legacy services model. The method may further include providing a target system model and mapping the legacy services model into an independent service model. The method may further include migrating the independent service model having the mapped legacy services model onto the target system model and providing the target system model to a target system.

20 Claims, 12 Drawing Sheets

(56) References Cited

U.S. PATENT DOCUMENTS

| | | | |
|---|---|---|---|
| 2011/0131589 A1* | 6/2011 | Beaty | H04L 67/10 719/318 |
| 2011/0276675 A1* | 11/2011 | Singh | G06F 9/4856 709/223 |
| 2012/0311106 A1* | 12/2012 | Morgan | G06F 9/45558 709/220 |
| 2013/0083693 A1* | 4/2013 | Himura | H04L 12/4641 370/254 |
| 2014/0149494 A1* | 5/2014 | Markley | H04W 4/60 709/203 |
| 2015/0020059 A1* | 1/2015 | Davis | G06F 8/60 717/171 |
| 2016/0094477 A1* | 3/2016 | Bai | H04L 47/786 709/226 |
| 2016/0212222 A1* | 7/2016 | Bultema | H04L 67/34 |
| 2016/0357693 A1* | 12/2016 | Walker | G06F 13/385 |
| 2017/0180196 A1* | 6/2017 | Patel | H04L 41/0859 |
| 2018/0039487 A1* | 2/2018 | Delaney | G06F 8/20 |
| 2018/0041393 A1* | 2/2018 | Munihanumaiah | H04L 41/0866 |
| 2018/0191823 A1* | 7/2018 | Bai | H04L 67/1095 |
| 2018/0332109 A1* | 11/2018 | Branch | H04L 41/12 |
| 2018/0359146 A1* | 12/2018 | Bevemyr | H04L 41/08 |
| 2019/0215241 A1* | 7/2019 | Ben Ami | H04L 41/0853 |
| 2020/0387356 A1* | 12/2020 | Davis | G06F 8/72 |

OTHER PUBLICATIONS servicenowdocs.com, "Understanding Service Mapping," retrieved online Jan. 17, 2019, https://docs.servicenow.com/bundle/london-it-operations-management/page/product/service-mapping/concept/service-mapping-get-started.html.

* cited by examiner

SYSTEM CONFIGURATION ANALYSIS FOR MIGRATION

This application claims the benefit of U.S. Prov. Appl. No. 62/803,577, filed Feb. 10, 2019. This application is incorporated herein by reference in its entirety to the extent consistent with the present application.

BACKGROUND

Many businesses run complex computing systems, which may include numerous computing devices, network devices, servers, routers, etc. Such computing systems may require updating in response to changes in technology. In certain circumstances, the changes may implement new technology that is incompatible with existing infrastructure. As such, migrating to the new technology may require replacement or conversion of many system components.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
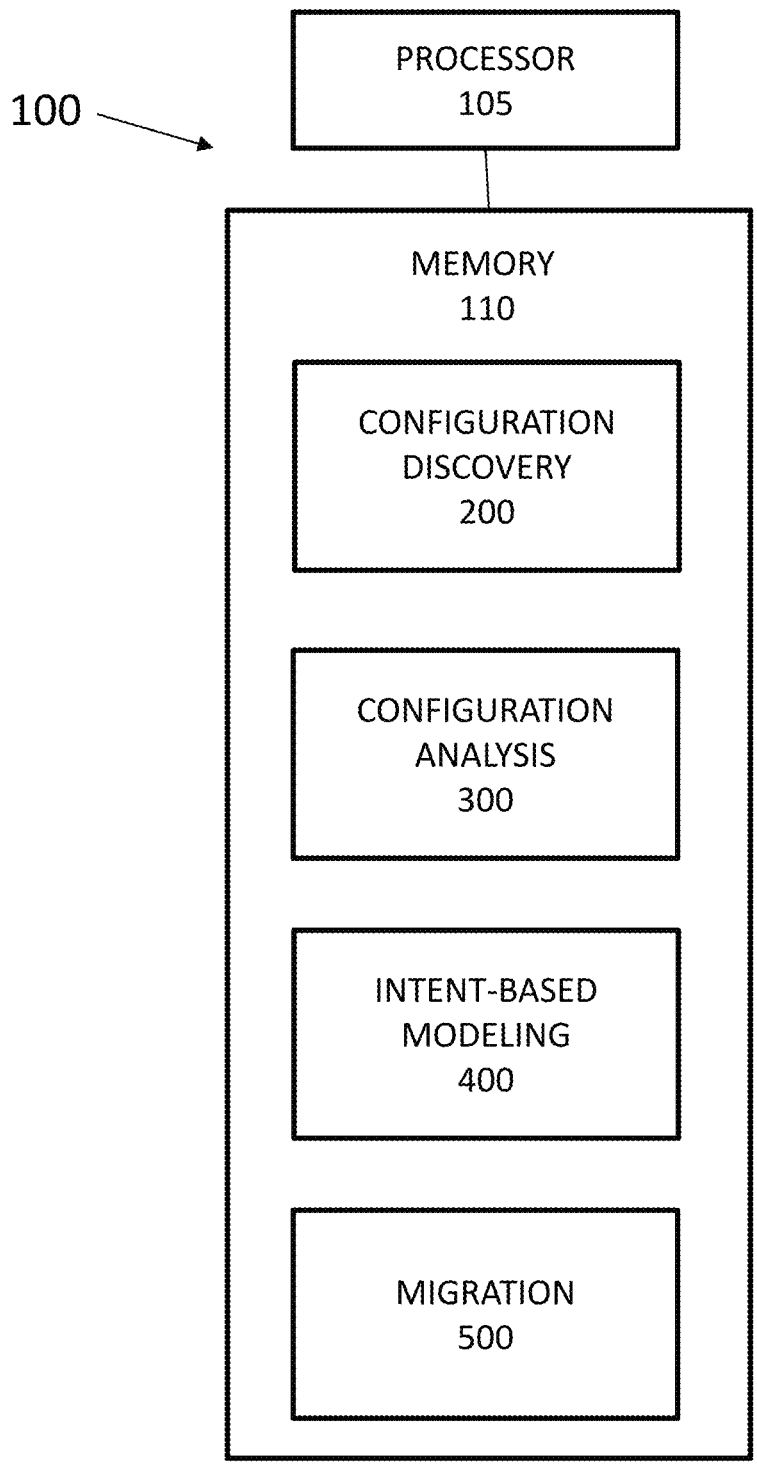
FIG. 1 is a schematic representation of a computing device for system migration, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which, will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Migration to new technologies may include the replacement and/or provisioning of numerous system components. As such, migration may result in relatively high costs, including the cost for manual processes, site visits, and transitions, e.g., double license costs for old and new systems. Migration may also result in delayed or reduced revenue as a result of lower sell rates for new services. Still further, migration may include various risks associated with new system configuration inconsistencies and manual transitions that may result in long down times, long periods of mixed setups between the new and old systems, as well as other potential issues.

For example, in one circumstance, a company may have over 2000 customers, 40,000 devices, and a staff of 60. The estimated migration time period for such an operation using manual approaches may be in excess of six years. As a result of the long time periods and costs associated therewith, many companies choose not to migrate to new technology.

Systems and methods of the present disclosure may provide migration techniques that allow for a substantially automated configuration of devices within a system. By modeling the old, legacy, systems and analyzing such legacy systems, configurations for new systems may be determined. The new system configurations may then be provisioned as needed, thereby allowing companies to migrate to new technology. By using such modeling and analysis systems, companies may decrease migration costs, decrease migration risks, and decrease potential downtime. For example, in the migration case discussed above, using such modeling and analysis tools, migration time may be decreased to two years, instead of more than six years. Additionally, costs may be decreased as a result of fewer staff, fewer site visits, the shorter time period, and decreased migration risks that may otherwise cause system downtime or lost revenue.

Generally, systems and methods disclosed herein may provide for the discovery of components of a legacy system. The discovery phase may include determining features that are used by each component of the system and organizing the collected information into structured models. The structured models may then be analyzed to determine patterns in system component use, thereby providing a legacy model for the legacy system. Using the determined patterns, the legacy model may be mapped onto an independent service model, which defines how the provided services should look, regardless of the underlying technology. With a defined independent service model, the legacy model, including legacy system configurations, may be migrated to a target model for the new technology. Accordingly, while the target model may be different from the legacy model, the configuration of services for the target model may match the target system and new technology specifications. Accordingly, migration from an old technology to a new technology may occur more efficiently with less risk of component or service failure during the process. Detailed aspects of the present disclosure are discussed below with respect to specific systems and methods.

Turning to FIG. 1, a schematic representation of an example computing system 100 for hardware management according to one or more examples is shown. The computing device 100 may use software, hardware, firmware, or logic to perform functions described herein.

Computing device 100 may include hardware and/or programming instructions configured to share information. The hardware, for example, may include one or more processors 105 (one shown) and memory 110, e.g., computer-readable medium ("CRM"), machine readable medium ("MRM"), database, etc. Processors 105 may include any set of processors capable of executing instructions stored by a memory 110. Processor(s) 105 may be implemented in a single device or distributed across multiple devices. The program instructions, e.g., computer readable instructions ("CRI") may include instructions stored on the memory 110 and executable by the processor(s) 105 to implement a desired function.

Memory 110 may be in communication with processor 105. Memory 110 may include any set of memory components capable of storing instructions that may be executed by processor 105. Memory 110 may be a non-transitory CRM or MRM. Memory 110 may also be integrated in a single device or distributed across multiple devices. Further, memory 110 may be fully or partially integrated in the same apparatus as processor 105 or it, may be separate but accessible to that processor 105. Computing device 100 may be implemented on a participant device, on a server device, on a collection of server devices, or a combination of the participant device and the server device.

A set of modules, e.g., a configuration discovery module 200, a configuration analysis module 300, an intent-based modeling module 400, and a migration module 500, may include CRI that when executed by the processor 105 can perform functions. The set of modules may be sub-modules of other modules. For example, the configuration discovery module 200 and the configuration analysis module 300 may be sub-modules or contained within the same computing device 100. In another example, the set of modules may include individual modules at separate and distinct locations, e.g., CRM, etc.

As briefly discussed above, computing device 100 may use a number of modules to discover services and/or equipment features used in legacy systems, analyze the legacy system configuration, model a new system configuration based on the legacy system configuration, and provide the new system configuration for migration onto a target system. Each module will be discussed in detail below.

Figure 2:
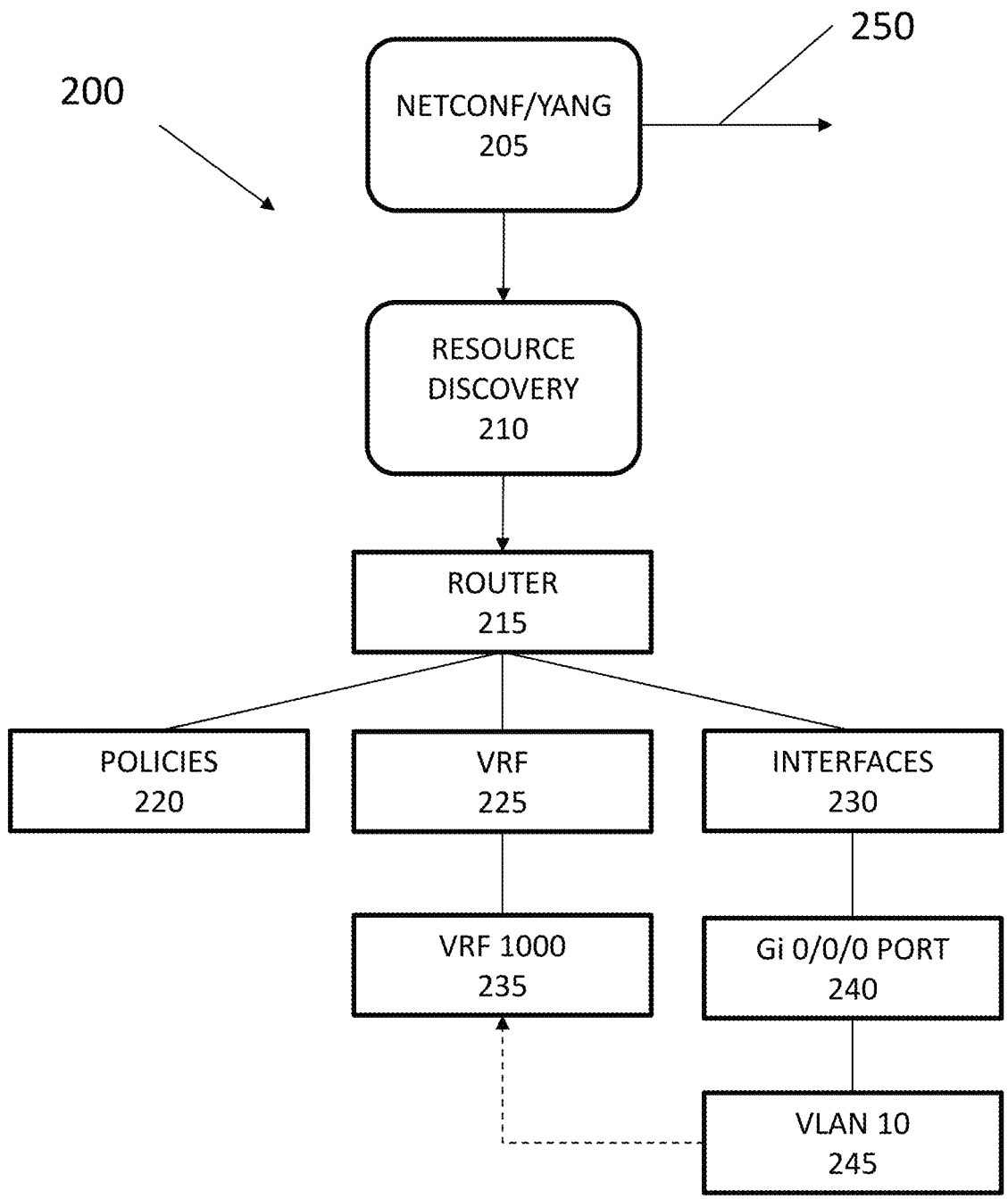
FIG. 2 is a schematic representation of configuration discovery, according to one or more examples of the disclosure.

Turning to FIG. 2, a schematic representation of configuration discovery, in accordance with one or more examples of the present disclosure is shown. Configuration discovery may occur in a configuration discovery module, 200 of FIG. 1. Configuration discovery refers to extracting a system configuration from a legacy system. In order to extract the system configuration, from the legacy system, legacy system configurations may be translated into a structured format, such as Yet Another New Generation ("YANG") format. YANG is a data modeling language for a definition of data sent over the Network Configuration Protocol ("NETCONF"). NETCONF may provide mechanisms to install, manipulate, and/or delete configurations on network devices. NETCONF/YANG 205 may collectively refer to the use of YANG over NETCONF. In other implementations, other structured format and/or data modeling languages may be used. For example, in another implementation, Open Application Programming Interface ("Open API") may be used.

During implementation, NETCONF/YANG 205 may allow for the determination of information from devices and/or services on a legacy system organized as a structured model. Use of the structured model will be discussed in detail with respect to FIG. 3. To determine device/service information, equipment configuration from devices and services within the legacy system are collected. For example, in certain implementations, the equipment configuration for all devices and services within the legacy system are collected.

For example, in FIG. 1, NETCONF/YANG may use resource discovery 210 in order to collect information about devices/services in the legacy system. Resource discovery 210 may include algorithms or other tools for collecting information and subsequently outputting the information through NETCONF/YANG. In this implementation, the legacy system may include a router 215. In other implementations, the legacy system may include other types of computing devices, network devices, storage devices, and the like. In certain implementations, the legacy system may include hundreds or thousands of devices.

Router 215 may include one or more policies 220. Policies 220 may provide instructions as to how routing decisions are made within a particular network. Router 215 may further include virtual routing and forwarding ("VRF) 225, thereby allowing multiple instances of a routing table to exist in router 215. Router 215 may also include one or more interfaces 230. Interfaces 230 may have one or more ports, such as gigabit ("Gi") 0/0/0 port 240. Gi 0/0/0 port 240 may be connected to a virtual area network ("VLAN") 245, which may be connected to a VRF 1000, character reference 235, of VRF 225.

Resource discovery 210 may thus discover the various devices, services, features, and configurations of each device within the legacy system. The legacy system configuration may then be extracted using NETCONF/YANG 205 and outputted 250 into a structured model. Generally, the structed model may include device configuration, such as router 215 configuration, that is machine-readable. The structured model may be used to derive additional information, which will be discussed in detail below with respect to FIG. 3.

While a specific set of devices, services, features, and configurations have been discussed with respect to FIG. 2, in other implementations, various other types of devices, services, features, and configurations may be extracted from the legacy system. When such devices, services, features, and configuration have been discovered and extracted from the legacy system, the extracted structured model may be analyzed.

Figure 3:
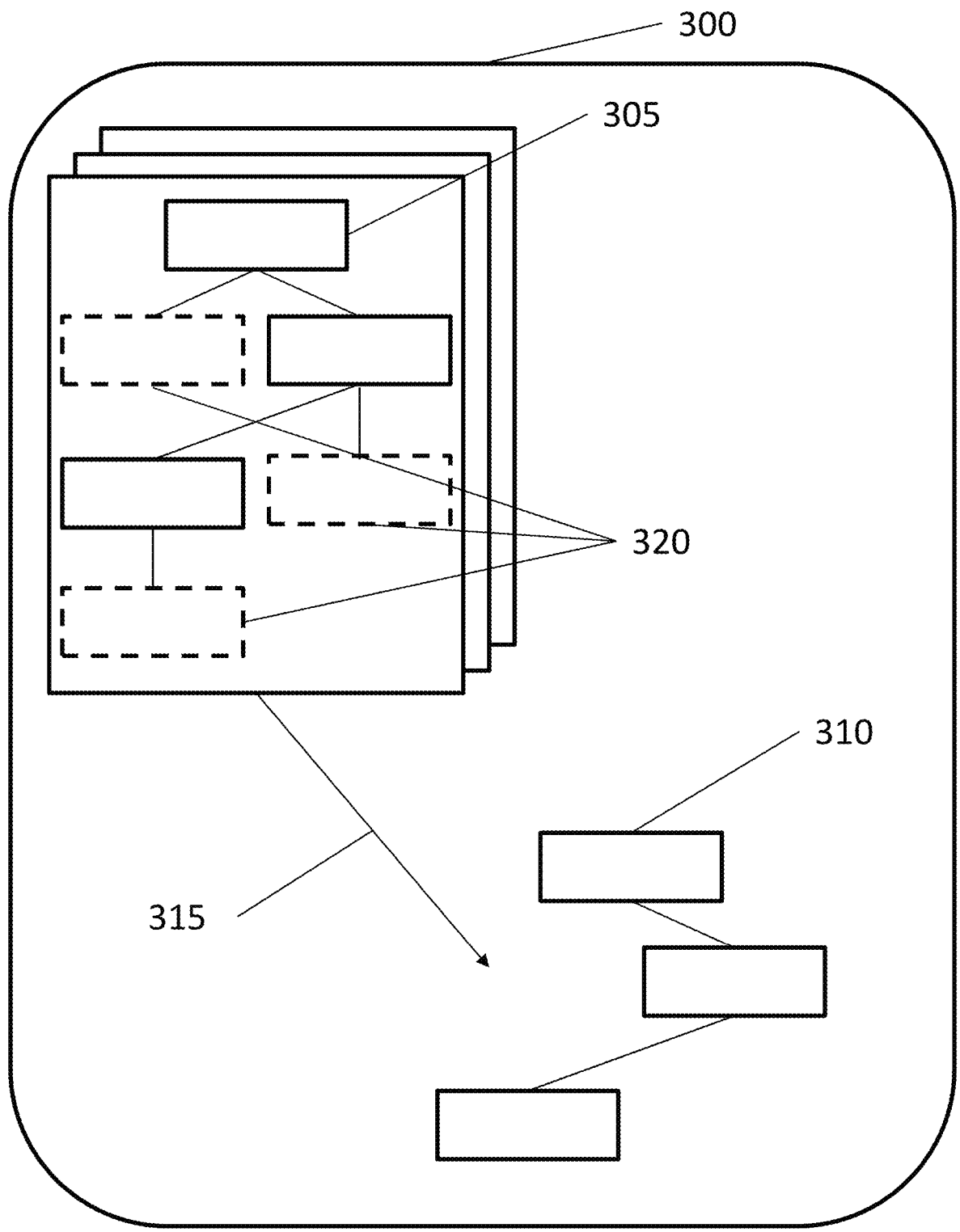
FIG. 3 is a schematic representation of configuration analysis, according to one or more examples of the disclosure.

Turning to FIG. 3, a schematic representation of configuration analysis, in accordance with one or more examples of the present disclosure is shown. Configuration analysis may occur in a configuration analysis module, 300 of FIG. 1. Configuration analysis refers to a process of deriving patterns from a structured model 305 that allows a legacy services model representative of the legacy system to be generated. The legacy services model may then be used to determine what network features may be implemented during migration, such as in a particular order, thereby reducing migration risk and optimizing deployment to a new target system.

Structured model 305 may be the output, 250 from discovery module, 200 of FIG. 1. Accordingly, structured model 305 may include the devices, services, features, and configurations of the legacy system. With this information, one or more patterns 310 may be extracted from the legacy system configuration. Patterns 310 may be representative of frequently used configuration patterns. For example, one or more specific patterns 310 may be extracted that include features on devices that are used in a certain number of devices.

In one implementation, features that are used in 80% of devices may be considered frequently used features, and as such, patterns 310 representative of the features may be extracted. In other implementations, features that are used in 50% of devices may be considered frequently used features. In still other implementations, features that are used in more than 80% of devices, more than 50% of devices or more than 90% of devices may be considered frequently used features. In still other implementations, frequently used features may be defined in terms of ranges. For example, features used in 60% to 80% of devices may be considered frequently used features, while features used in less than 60% to 25% of devices may be considered less frequently used features. Other ranges may include features used in 80% to 90% of devices may be considered frequently used features while features used in less than 80% of devices may be considered less frequently used features.

In still other implementations, frequently used features may not be defined. In such implementations, less frequently used features may be determined rather than frequently used features. For example, less frequently used features may include features used in less than 75% of devices, less than 50% of devices, or less than 25% of devices. By determining less frequently used features, the features may be excluded from patterns 310, thereby allowing the frequently used features to be extracted into patterns 310.

In order to determine patterns 310, and thus the frequency of use of particular features, datamining may be used. To mine structured model 305, various datamining tools may be used, including for example, datamining in R. R is a programming language for statistical computing supported by the R Foundation for Statistical Computing. R, as a programming language, may thereby allow for the identification of patterns 310 of commands used for particular services.

To determine patterns 310, configuration elements in structured table 305 may be reduced to configuration options, i.e., keywords, thereby eliminating numerical instances or other parameters. The keywords may include specific features or services that run on specific devices defined in text, such as the name of a feature or service. Because the keywords do not include numerical instances or specific parameters, the keywords may be analyzed through Market Basket analysis in, for example the R programming language. Market Basket analysis refers to the identification of patterns by looking for combinations of items that occur together frequently in transactions. Thus, in one implementation, Market Basket analysis may be used to determine which features are used throughout the legacy system, and at what rate such features are used. For example, a number of devices may use the same feature. The number of devices that use the feature may be determined and then the number of devices using the feature may be divided by the total number of devices in the legacy system to determine a percentage use. The percentage use of the feature may be used to determine patterns 310 of use, as well as frequently used features.

After patterns 310 are identified using Market Basket analysis, patterns 310 may be exported 315 to derive a legacy services model, which will be discussed below with respect to FIG. 5. Patterns 310 may include groupings of features that include, for example, frequently used features and/or features that are grouped according to particular feature type, device, configuration, etc. Excluded features 320 may not be included in particular patterns 310; however, excluded features 320 may be included in other patterns 310 which are extracted separately. Accordingly, certain patterns 310 may be identified that effect more components of the legacy system and may be migrated first in order to decrease migration risk. To further understand Market Basket analysis and the identification of patterns 310, a graphical representation of the output of the analysis is provided in FIG. 4.

Figure 4:
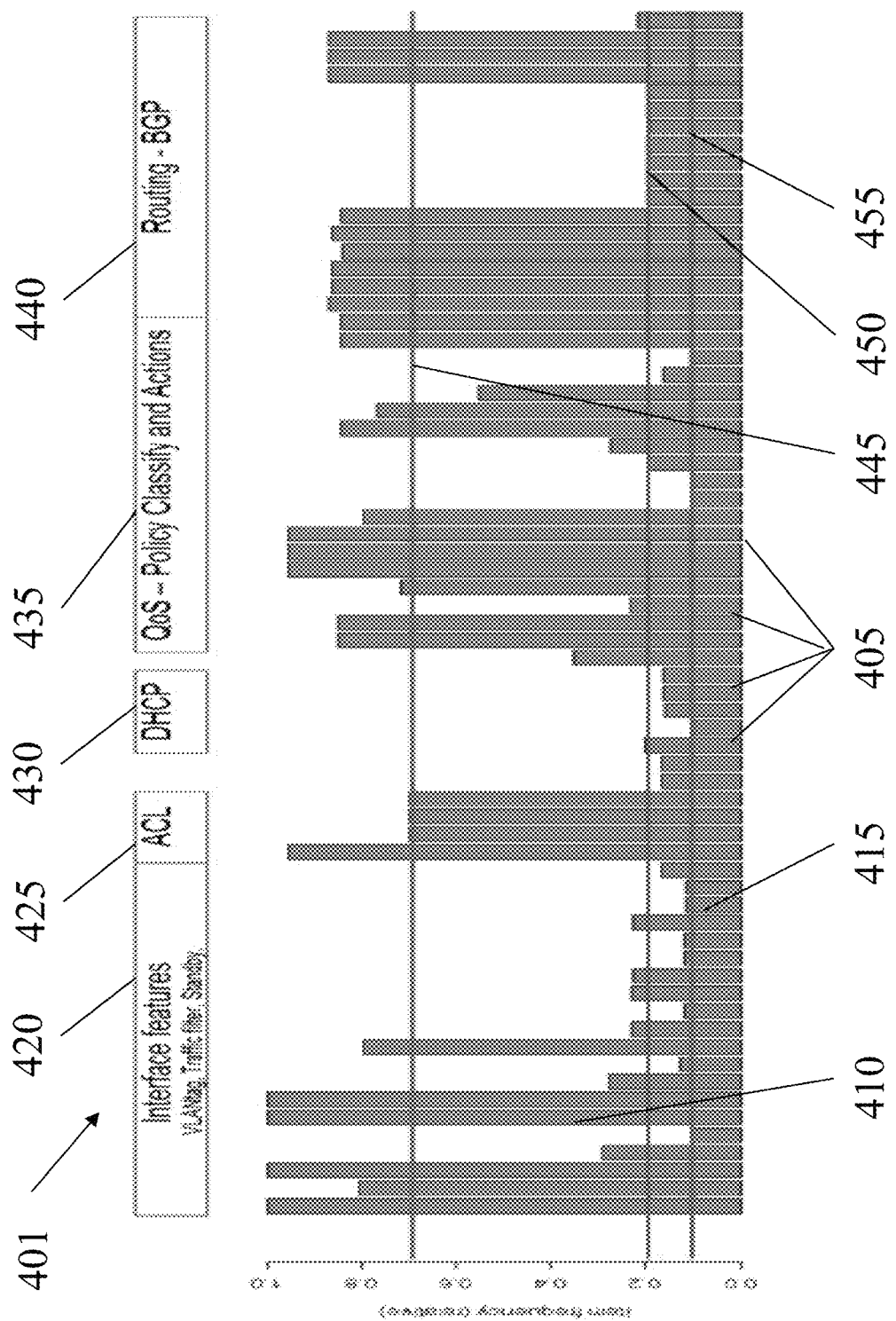
FIG. 4 is a graphical representation of features in a system, according to one or more examples of the disclosure.

Turning to FIG. 4, a graphical representation 401 of features in a system, in accordance with one or more examples of the present disclosure is shown. The structured model may include numerous configurations for the legacy system. The configurations may include a number of features 405, which are identified in graphical representation 401 as bars in a graph. The frequency of use of features 405 may be represented based on the height of a specific bar. For example, a feature 410 may have a relative item frequency of 1.0, while a feature 415 may have a relative item frequency of 0.1. As such, feature 410 may have a frequency of use of 100%, while feature 415 may have a relative item frequency of use of 10%.

Additionally, Market Basket analysis may allow for the grouping of specific features 405 based on type. For example, in graphical representation 400, Interface Features 420 may be grouped together. Similarly, ACL features 425 may be grouped, DHCP features 430 may be grouped, QoS—Policy Classify and Actions 435 may be grouped, and Routing—BGP 440 may be grouped. The groupings may allow for identification of the types of features that are used in specific configurations. The frequency of use and grouping may thus be used to determine the patterns of use, as discussed above with respect to FIG. 3.

Frequently used items may also be identified within graphical representation 401 through use of visual aids. For example, an area above a frequently used feature bar 445 may represent the features that are considered frequently used. In this implementation, frequently used feature bar is set at 0.7, indicating that features that are used in more than 70% of devices may be considered frequently used features. Similarly, a less frequently used feature bar 450 may set at 0.2, thereby indicating that features that are used in less than 70% of devices may be considered less frequently used features. Additional bars, such as a baseline bar 455 may be used to identify the least used features. In this implementation, baseline bar 455 may be set to 0.1, thereby indicating that the features at or below baseline bar 455 are used in 10% or less of the devices.

Figure 5:
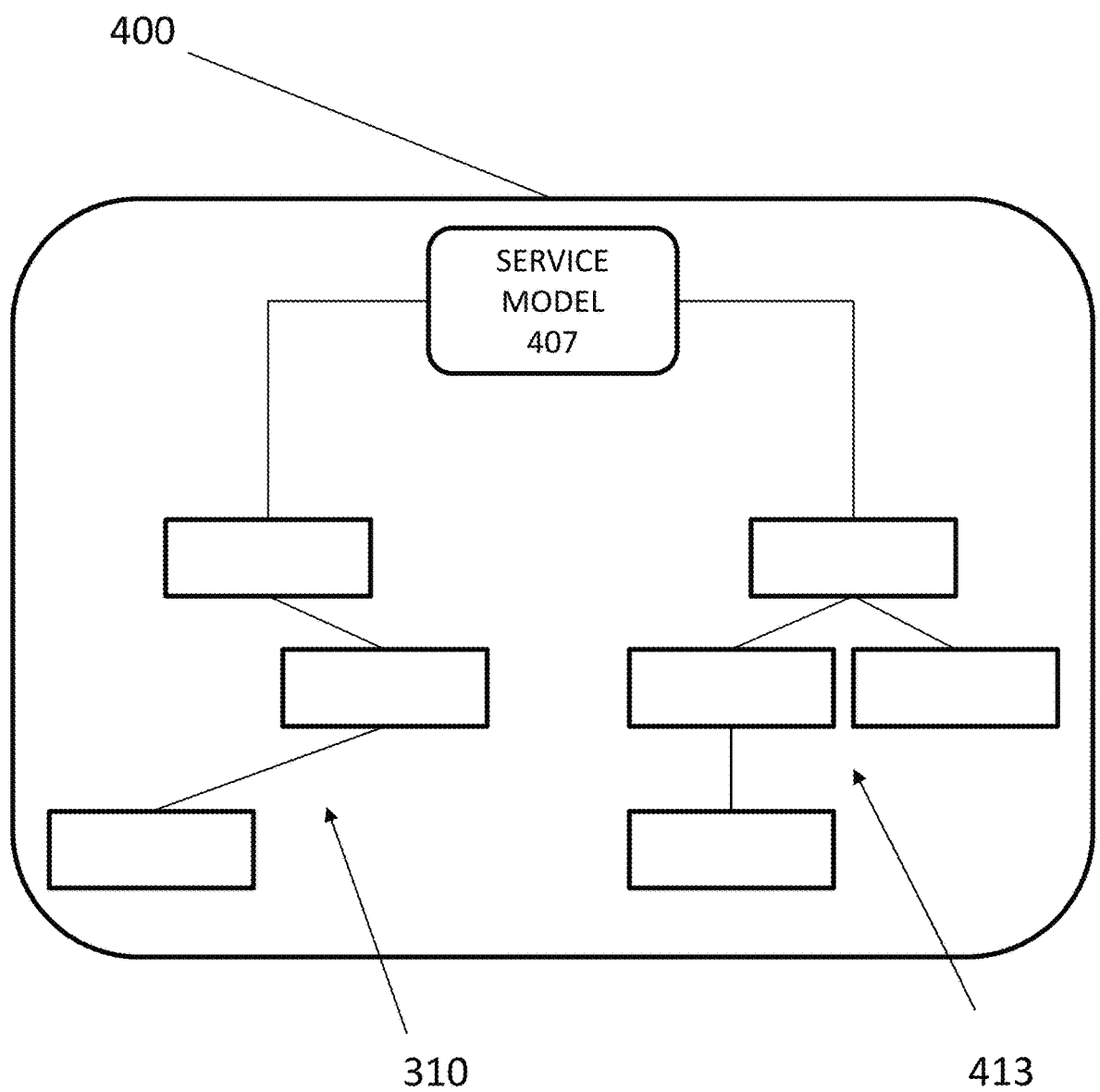
FIG. 5 is a schematic representation of intent-based modeling, according to one or more examples of the disclosure.

Turning to FIG. 5, a high-level schematic representation of intent-based modeling, in accordance with one or more examples of the present disclosure is shown. Intent-based modeling may occur in an intent-based modeling module 400. Intent-based modeling may generally refer to declaring intents for particular devices or systems and translating the intents into device-level or system-level configurations. In operation, a user may define an intent, which is a desired outcome. Intent-based modeling module 400 may then use policy-based abstractions to express the intent as a model.

In this implementation, patterns 310 may be provided to a service model 405, which may also include a target system model 413. Target system model 413 may provide equivalent functionality for a target system, while taking into consideration the functionality evidenced by patterns 310 of the legacy system. Accordingly, a transition from a legacy system to a target system may occur with less risk of loss of functionality. Because patterns 310 represent devices, features, and configurations of the legacy system, service module 407 may be provided such information and then migrate corresponding information to target system model 413. The specific devices and features of target system model 413 may differ from those defined by patterns 310, however, the differences may occur as a result of differences in the technology and/or required devices, features, and configurations. This process is described in greater detail with respect to FIG. 6.

Figure 6:
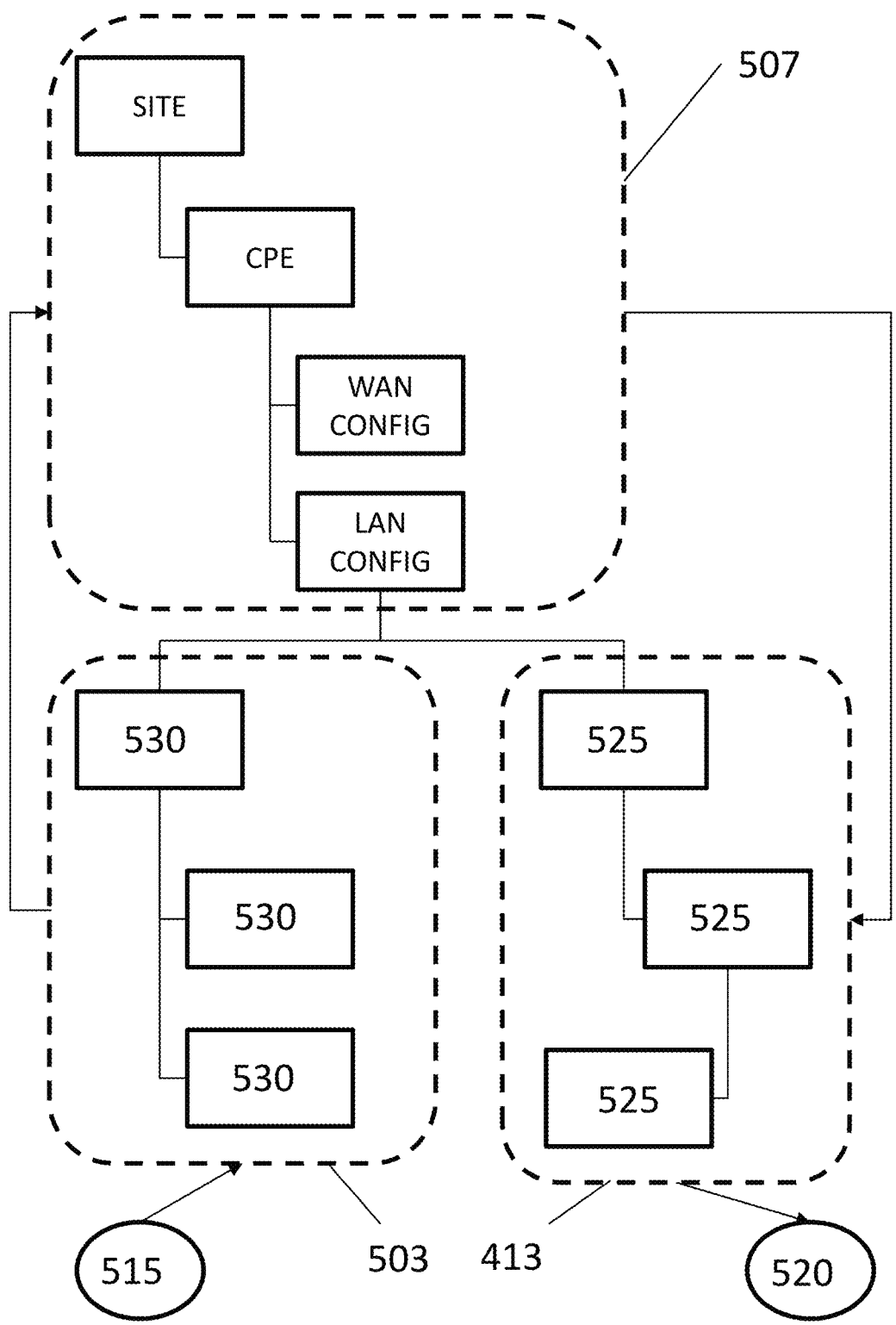
FIG. 6 is a schematic representation of mapping customer services using intent-based modeling, according to one or more examples of the disclosure.

Turning to FIG. 6, a schematic representation of mapping customer services using intent-based modeling, in accordance with one or more examples of the present disclosure is shown. Mapping customer services using intent-based modeling may occur in intent-based modeling module, 400 of FIGS. 1 and 5. In this implementation, intent-based modeling may allow for a legacy services model 503 to be mapped to an independent service model 505, which may then be used to define configurations for a target system model 413.

In operation, a legacy system 515 may be evaluated, as discussed above, to create legacy services model 503. Legacy services model 503 may include the patterns of devices, features, and/or configurations of legacy system 515. Independent service model 505 defines how a particular system should look. Independent service model 505 does not take into consideration specific technology, rather, it defines the functionality a type of system should provide.

Accordingly, legacy service model 503 may be mapped onto independent service model 505 using intent-based modeling. During the modeling, different equipment configurations from legacy system 515 may be mapped into a service representation that is expressed in independent service model 505. For example, legacy system 515 may include thousands of different equipment configurations for a particular service. By mapping the patterns from legacy services module 503 into independent service model 505, the different equipment configurations may be coalesced into a single service representation. The coalesced configuration may thereby allow standardization in a new target system 520, thereby decreasing the complexity of new target system 520.

Once independent service model 505 is defined, the legacy service configuration can be migrated to target system model 413. Target system model 413 includes a representation of target equipment 525 that is used in target system 520. As such, the configurations of legacy equipment 530 may be migrated to target equipment 525 without a loss of functionality. As illustrated, the target equipment 525 may look different than legacy equipment. However, independent service model 505 allows the configuration of legacy equipment 530 to be migrated to target equipment 525, thereby creating correct service instance configurations for target equipment 525.

Figure 7:
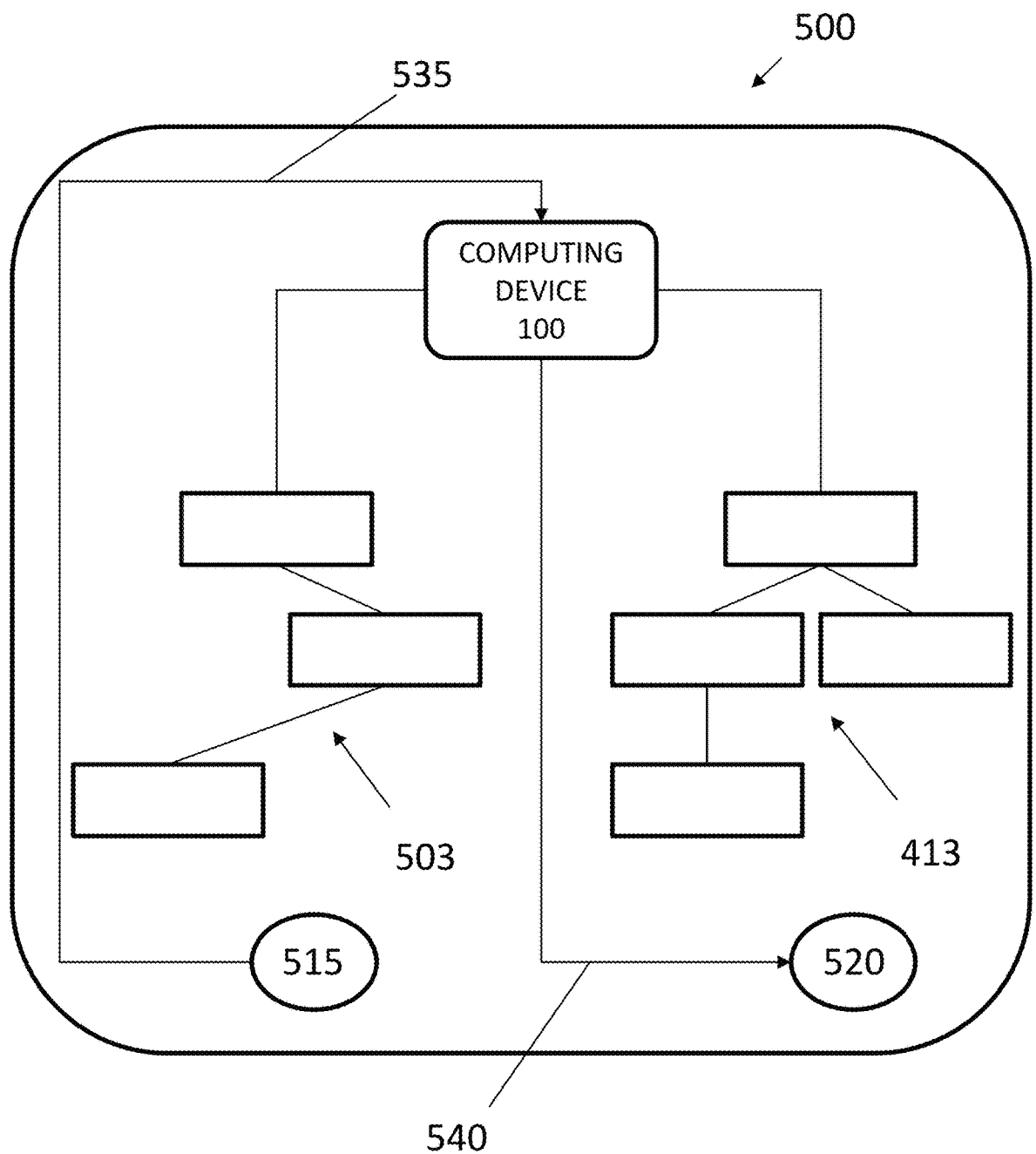
FIG. 7 is a schematic representation of migrating to a target system, according to one or more examples of the disclosure.

Turning to FIG. 7, a schematic representation of migrating to a target system, in accordance with one or more examples of the present disclosure is shown. Migrating to a target system may occur in a migration module, 500 of FIG. 1. Migration refers to taking the configurations and functionality of legacy system 515 and transferring such configurations and functionality to target system 520. Thus, combining the discussion above, information about legacy system 515 may be discovered and provided 535 to computing device 100. The information provided 535 may include legacy model 503 derived from patterns found while extracting the legacy system configuration.

The information provided 535 may then be analyzed and modeled by computing device 100, thereby mapping legacy model 503 onto the service model. The configurations in the service model may then be migrated to target system model 413. Computing device 100 may then use target system model 413 to provision 540 equipment in target system 520.

Figure 8:
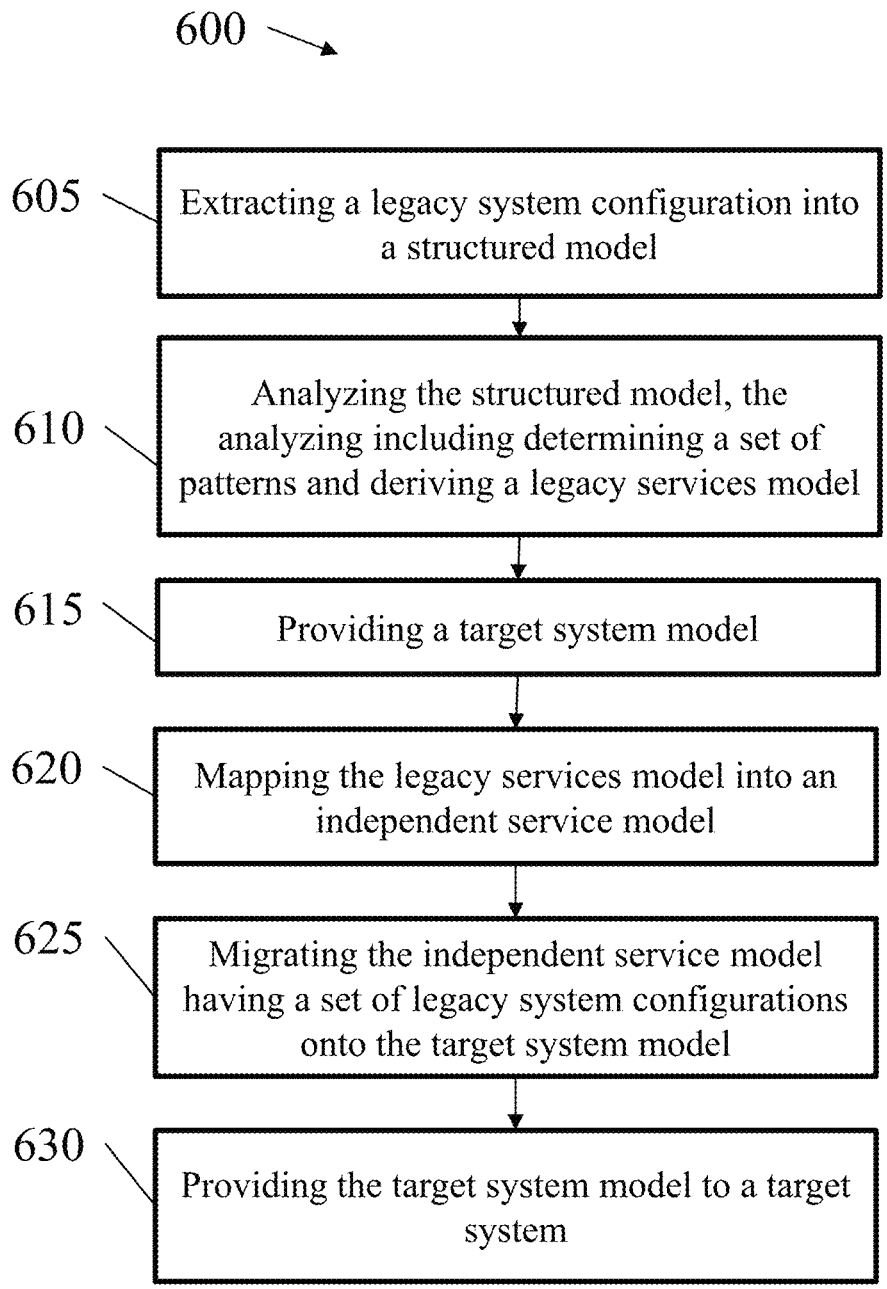
FIG. 8 is a flowchart depicting a method for providing system configuration analysis for target system migration, according to one or more examples of the disclosure.

Turning to FIG. 8, a flowchart depicting a method 600 for providing system configuration analysis for target system migration, in accordance with one or more examples of the present disclosure is shown. In operation, method 600 may include extracting (block 605) a system configuration into a structured model. The system configuration may include the legacy system configuration that is representative of devices, features, and configurations of the legacy system.

For example, the system configuration may include lists of the different features that are used by different devices within the legacy system. In certain implementations, the legacy system configuration may include lists of all features used by all devices within the legacy system. In order to extract the system configuration into a structed model, NETCONF/YANG may be used. As such, the features of the legacy system may be converted into a structed YANG format, which may be machine-readable, thereby allowing further manipulation of the extracted information.

In operation, method 600 may further include analyzing (block 610) the structured model, the analyzing including determining a set of patterns and deriving a legacy services model. With the structed model in machine-readable format, the structured model may be analyzed using, for example, one or more datamining techniques. In certain implementations, datamining may occur through use of statistical algorithms programmed through, for example, the R computing language. In other implementations, other datamining tools may be used to determine a set of patterns from the structured model.

In operation, datamining may be used to detect patterns, such as frequency of use, of particular features within the legacy system. In certain implementations, the datamining may be used to determines a set of frequently used features, such as features that are used more than 80% of the time. In other implementations, the set of frequency used features may include different relative uses, such as those discussed in detail above. In still other implementations, the datamining may be used to determine less frequently used features. In certain implementations, datamining may be expressed as a graphical representation, such as the graphical representation provided in FIG. 4. As such, the structured model may include building a normalized view of a set of features from a plurality of devices in a legacy system that includes the legacy system configuration Analyzing the structured model may further include deriving a legacy services model. The legacy services model may include a representation of patterns and/or other information about the legacy system, including devices, features, and configurations. In one example, the legacy services model may include a list of features and configurations for a particular service. In operation, the legacy services model may include information about all devices, features, and configurations of the legacy system. In certain implementations, multiple legacy service models may be used, thereby allowing particular services to be provisioned independently. As such, the legacy services model may include information about the legacy system as a whole or may include information about specific devices, features, and/or components of the legacy system.

In certain implementations, analyzing the structured model may further include determining a migration approach. For example, the analyzing may provide an order in which features and/or configurations may be provided to a target system, may define a time period for providing features and/or configurations, or may otherwise indicate certain features and/or configurations not to include to the target system.

In operation, the method 600 may further include providing (block 615) a target system model. The target system model may include information about the equipment that is provided for the target system. For example, the target system model may include a list of devices arranged in a tree format that allows the connectability of the devices within the target system to be represented. Thus, the target system model may provide information about the formation of equipment of the target system.

In operation, the method 600 may further include mapping (block 620) the legacy services model into an independent service model. The mapping may include taking equipment configurations about specific devices in the legacy service model and applying the to the functionality defined in the independent service model. As the independent service model provides an extrapolated expression of how a system should function, the configurations of legacy services model may be mapped onto independent service model without defining the specific equipment that will be used in the target system. As such, the mapped independent service model may provide an expression of how the legacy system configurations may be provided without being mapped to specific equipment or a specific environment.

The independent service model may thereby coalesce different equipment configurations, thereby introducing standardization and decreasing complexities with a system. The coalescing may also remove redundant or unnecessary configurations that occur in the legacy system. In certain implementations, the mapping the legacy services model into the independent service model may include intent-based mapping, as discussed above in detail.

In operation, the method 600 may further include migrating (block 625) the independent service model having a set of legacy system configurations onto the target system model. The legacy system configurations may be provided through the legacy services model, such that when the legacy services model was mapped into the independent service model, the configurations for the legacy system were defined as functionality within the independent service model. As the target system model includes the equipment that may be used in the target system, the configurations provided in independent service model may thereby provide equivalent functionality to equipment of the target system. As such, the target system model may include a different service instance configuration than the legacy services model.

In operation, the method 600 may further include providing (block 630) the target system model to a target system. As the target system model includes the configurations for the target system, by providing the target system model to the target system, equipment of the target system my subsequently be provisioned with the configuration in the target system model. Accordingly, in certain implementations, the new model may be migrated onto the target system.

Figure 9:
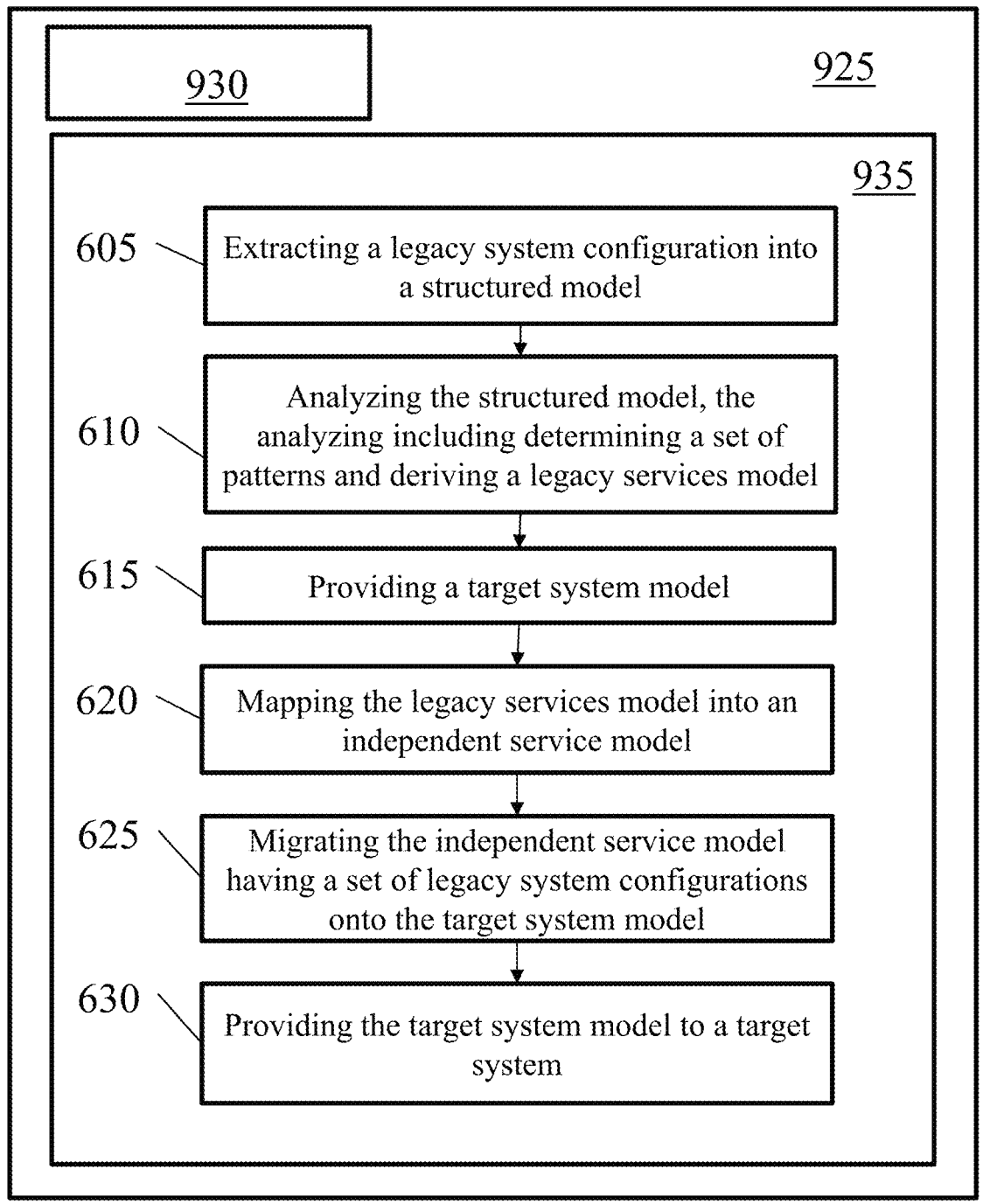
FIG. 9 is an example computing device with a hardware processor and accessible machine-readable instructions, according to one or more examples of the disclosure.

Turning to FIG. 9, an example computing device with a hardware processor and accessible machine-readable instructions is shown in accordance with one or more examples of the present disclosure. FIG. 9 provides an example computing device 925, with a hardware processor 930, and accessible machine-readable instructions stored on a machine-readable medium 935 for generating information about a product as discussed above with respect to one or more disclosed example implementations. FIG. 9 illustrates computing device 925 configured to perform the flow described in blocks 605, 610, 615, 620, 625, and 630 discussed in detail with respect to FIG. 8. However, computing device 925 may also be configured to perform the flow of other methods, techniques, functions, or processes described in this disclosure.

A machine-readable storage medium, such as 935 of FIG. 9, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 10:
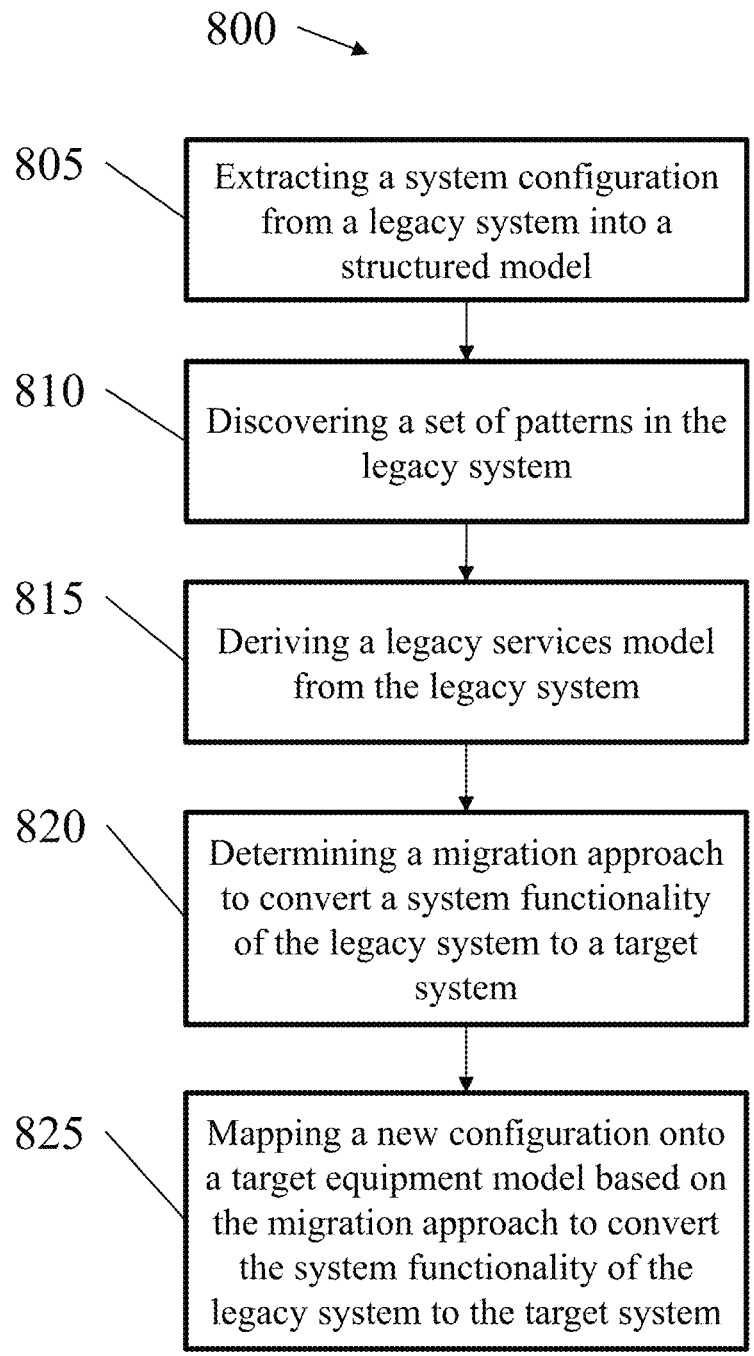
FIG. 10 is a flowchart depicting a method for determining a migration approach from a legacy system to a target system, according to one or more examples of the disclosure.

Turning to FIG. 10, a flowchart depicting a method 800 for determining a migration approach from a legacy system to a target system, in accordance with one or more examples of the present disclosure is shown. In operation, method 800 may include extracting (block 805) a system configuration from a legacy system into a structured model.

In operation, method 800 may further include discovering (block 810) a set of patterns in the legacy system. The patterns may include patterns representative of device configuration, frequency of feature use, or other such patterns as discussed above. Additionally, the patterns may be graphically depicted as set forth above in FIG. 4.

In operation, method 800 may further include deriving (bock 815) a legacy services model from the legacy system. The legacy services model may include information corresponding to the devices, features, and/or configurations of legacy system. Additionally, the legacy services model may include the patterns discovered within the legacy system.

In operation, method 800 may further include determining (block 820) a migration approach to convert a system functionality of the legacy system to a target system. For example, the analyzing may provide an order in which features and/or configurations may be provided to a target system, may define a time period for providing features and/or configurations, or may otherwise indicate certain, features and/or configurations not to include to the target system.

In operation, method 800 may further include mapping (block 825) a new configuration onto a target system model based on the migration approach to convert the system functionality of the legacy system to the target system. The new configuration may include a configuration that is different from that of legacy system, but provides the same functionality to the target system. Additionally, the order of the migration of certain features or configurations may be adjusted based on the migration approach that was previously determined. In certain implementations, the new configuration may further include a set of additional information that is not in one or more components of the legacy system. For example, components of the target system may have different operational capability, and as such, the new configuration may adjust information provided to the components in order to provide the same configuration as the legacy system.

Other aspects not explicitly discussed with respect to FIG. 10 may also be included, such as the operational aspects discussed above with respect to FIG. 8.

Figure 11:
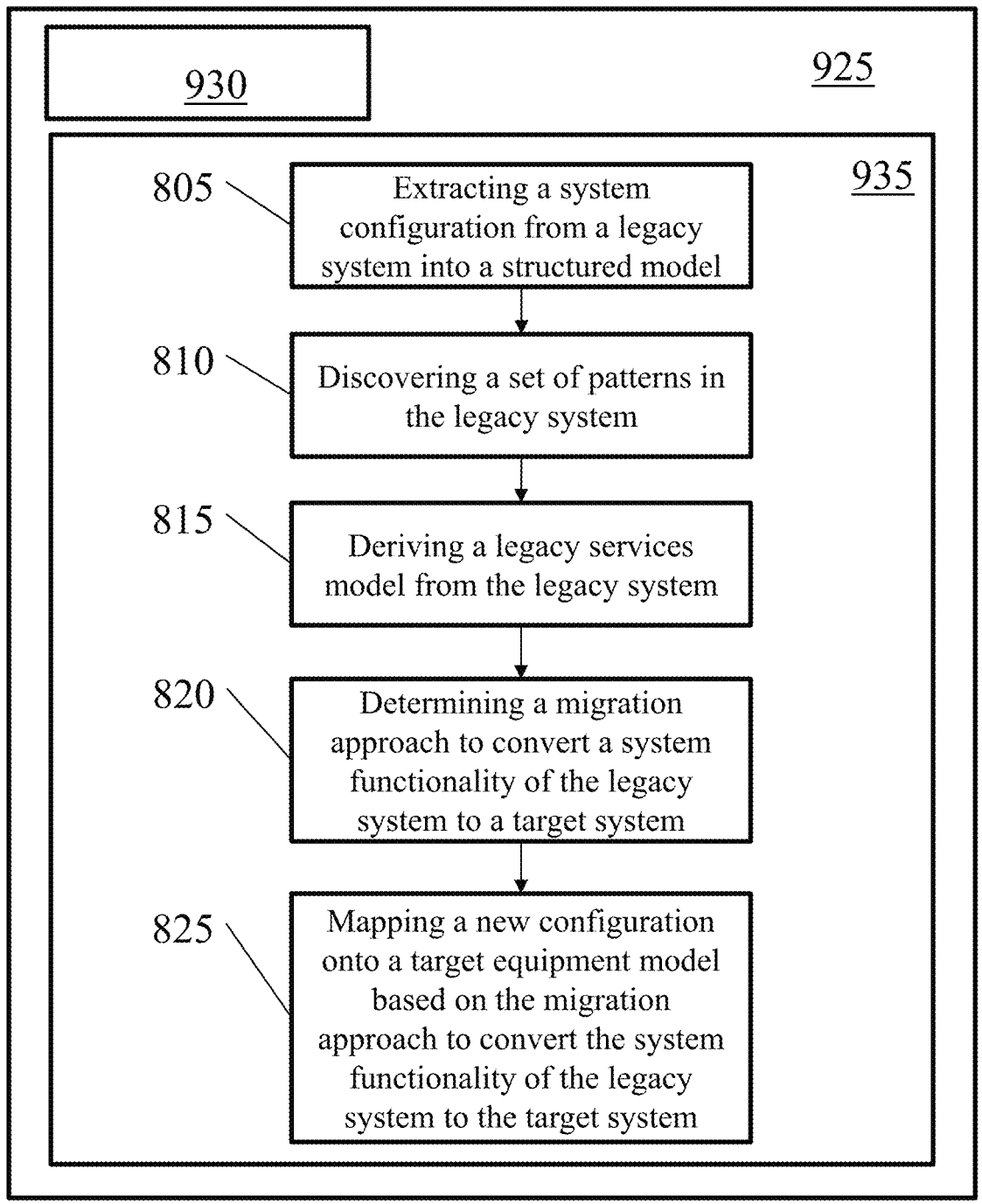
FIG. 11 is an example computing device with a hardware processor and accessible machine-readable instructions, according to one or more examples of the disclosure.

Turning now to FIG. 11, an example computing device with a hardware processor and accessible machine-readable instructions is shown in accordance with one or more examples of the present disclosure. FIG. 11 provides similar structural components discussed above with respect to FIG. 9, and as such, for purposes of clarity, only the differences in the figures will be discussed herein. FIG. 11 provides an example computing device 925, with a hardware processor 930, and accessible machine-readable instructions stored on a machine-readable medium 935 for managing data as discussed above with respect to one or more disclosed example implementations. FIG. 11 illustrates computing device 925 configured to perform the flow described in blocks 805, 810, 815, 820, and 825, discussed in detail with respect to FIG. 10.

Figure 12:
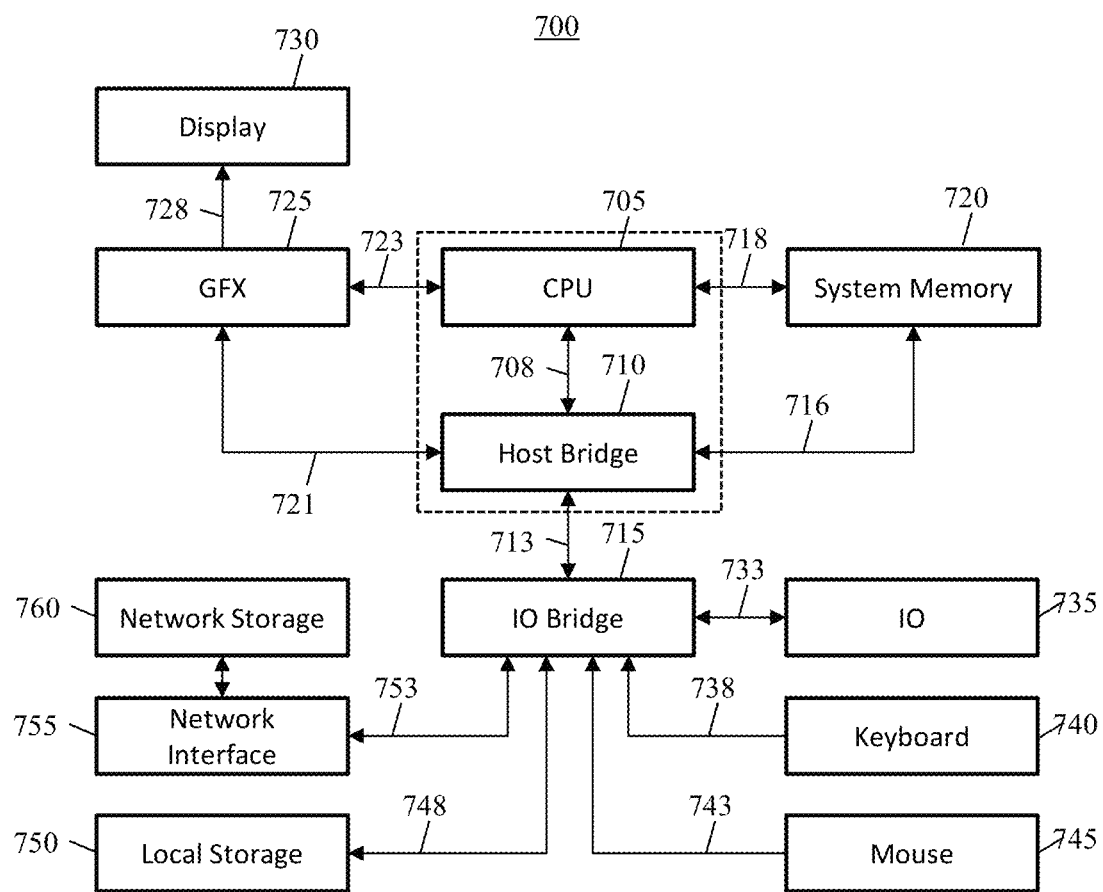
FIG. 12 is a schematic representation of a computer processing, device that may be used to implement functions and processes, according to one or more examples of the present disclosure, according to one or more examples of the disclosure.

Turning, now to FIG. 12, a schematic representation of a computer processing device 700 that may be used to implement functions and processes in accordance with one or more examples of the present disclosure is shown. FIG. 12 illustrates a computer processing device 700 that may be used to implement the systems, methods, and processes of this disclosure. For example, computing device 700 illustrated in FIG. 12 could represent a client device or a physical server device and include either hardware or virtual processor(s) depending on the level of abstraction of the computing device. In some instances (without abstraction), computing device 700 and its elements, as shown in FIG. 12, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

FIG. 12 shows a computing system 700 in accordance with one or more examples of the present disclosure. Computing system 700 may be used to implement aspects of the present disclosure, such as an orchestrator, a gateway manager, a cloud monitor, a local storage, a cloud-based storage, or any other device that may be used implementing the systems and methods for managing data discussed herein. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to IO bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. 10 bridge 715 may include an interface 713 to host bridge 710, one or more interfaces 733 to one or more 10 expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi®, Bluetooth®, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example examples The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:
    extracting a legacy system configuration into a structured model;
    analyzing the structured model, the analyzing including determining a set of patterns and deriving a legacy services model;
    providing a target system model which contains information about equipment that is used in a target system;
    in response to providing the target system model, mapping the legacy services model into an independent service model;
    in response to mapping the legacy services model into the independent service model, migrating the independent service model having the mapped legacy services model onto the target system model; and
    in response to migrating the independent service model having the mapped legacy services model onto the target system model, providing the target system model having the migrated independent service model to the target system.

2. The method of claim 1, further comprising migrating the target system model having the migrated independent service model onto the target system.

3. The method of claim 1, wherein the analyzing the structured model further comprises determining a migration approach.

4. The method of claim 1, wherein the mapping the legacy services model onto the independent service model includes intent-based modeling.

5. The method of claim 1, wherein the target system model includes a different service instance configuration than the legacy services model.

6. The method of claim 1, wherein the analyzing the structed model further comprises translating the legacy system configuration to a structured yet another next generation (YANG) format.

7. The method of claim 1, wherein the analyzing the structured model further comprises building a normalized overview of a set of features from a plurality of devices in a legacy system including the legacy system configuration.

8. The method of claim 1, wherein the analyzing the structured model further comprises determining an order for a set of features to implement in the target system model.

9. The method of claim 1, wherein the analyzing the structured model further comprises mining the legacy system configuration to identify the set of patterns.

10. The method of claim 1, wherein the set of patterns includes a set of frequently used features.

11. A system comprising:
    a configuration discovery module to extract a legacy system configuration into a structured model;
    a configuration analysis module to receive the structured model from the configuration discovery module and to derive a legacy services model; and
    an intent-based modeler module to receive the legacy services model from the configuration discovery module, to map the legacy services model onto an independent service model and, in response to mapping the legacy services model onto the independent service model, to migrate the independent service model having the mapped legacy services model onto a target system model, wherein the target system model contains information about equipment that is used in a target system.

12. The system of claim 11, wherein the configuration analysis module is to discover a set of patterns.

13. The system of claim 11, wherein the configuration analysis module is to determine a migration approach.

14. The system of claim 11, further comprising a migration module to provide the target system model having the migrated independent service model, for a target system.

15. The system of claim 11, wherein the configuration discovery module is connected to a computing system having the legacy system configuration.

16. A non-transitory computer readable medium comprising computer executable instructions stored thereon that, when executed by a processor in a source system, cause the processor to:
    extract a legacy system configuration from a legacy system into a structured model;
    discover a set of patterns in the legacy system;
    in response to discovering a set of patterns in the legacy system, derive a legacy services model from the legacy system;
    in response to deriving a legacy services model from the legacy system, determine a migration approach to convert a system functionality of the legacy system to a target system; and
    map a new configuration onto a target equipment model based on the migration approach to convert the system functionality of the legacy system to the target system, wherein the target equipment model is a model which contains information about equipment that is used in the target system.

17. The non-transitory machine readable storage medium of claim 16, wherein the instructions to discover the set of patterns in the legacy system further cause the processor to mine a plurality of components in the legacy system.

18. The non-transitory machine readable storage medium of claim 16, further comprising instructions that when executed by the processor cause the processor to determine an order to deploy a set of features to implement in the target system.

19. The non-transitory machine readable storage medium of claim 16, further comprising instructions that when executed by the processor cause the processor to transform the legacy system configuration into machine-readable YANG configurations.

20. The non-transitory machine readable storage medium of claim 16, wherein the new configuration includes a set of additional information not in one or more components of the legacy system.

* * * * *